United States Patent
Hirao

(10) Patent No.: US 6,674,956 B1
(45) Date of Patent: Jan. 6, 2004

(54) VISS SIGNAL DETECTING METHOD FOR DETECTING VISS SIGNAL OF VIDEO TAPE

(75) Inventor: Takuya Hirao, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 0 days.

(21) Appl. No.: 09/299,653

(22) Filed: Apr. 27, 1999

(30) Foreign Application Priority Data

Apr. 28, 1998 (JP) ............................................ 10-134528

(51) Int. Cl.[7] ................................................. H04N 5/91
(52) U.S. Cl. ......................... 386/69; 386/95; 348/231.5
(58) Field of Search .............................. 386/46, 95, 65, 386/69, 78, 88, 103; 348/281.5; 370/212; 360/72.1, 72.2

(56) References Cited

U.S. PATENT DOCUMENTS

| | | | | |
|---|---|---|---|---|
| 4,890,168 A | * | 12/1989 | Inoue et al. | 386/69 |
| 5,557,336 A | * | 9/1996 | Nakajima | 348/556 |
| 5,774,452 A | * | 6/1998 | Wolosewicz | 370/212 |
| 6,370,313 B2 | * | 4/2002 | Link et al. | 386/46 |

FOREIGN PATENT DOCUMENTS

JP    3-114067    11/1991

* cited by examiner

Primary Examiner—Vincent Boccio
Assistant Examiner—James A Fletcher
(74) Attorney, Agent, or Firm—Sughrue Mion, PLLC

(57) ABSTRACT

A VISS signal detection method for performing detection of a VISS signal of a video tape includes a step of executing a taking-up process of an interval between edges per level edge of the VISS signal, a step of performing a detection process of a VISS pulse, and a step of performing a detection process of the VISS signal on the basis of result of detection at the VISS pulse detection step. The process of the edge interval taking-in step is set as an interrupt process having highest preference. In the VISS pulse detection step, by making reference to a count value of an edge counter for distributing count values of a timer measuring the edge interval of a phase position detection signal added to the VISS signal used in the edge interval taking-in step, presence and absence of delay in the process of the VISS pulse is detected based on number of occurrence of the edge interval taking-in step occurring up to the VISS pulse detection step. When delay is caused, post process is performed for accurately performing detection process of the VISS depending upon delay and the edge interval taking-in process in the next cycle.

12 Claims, 12 Drawing Sheets

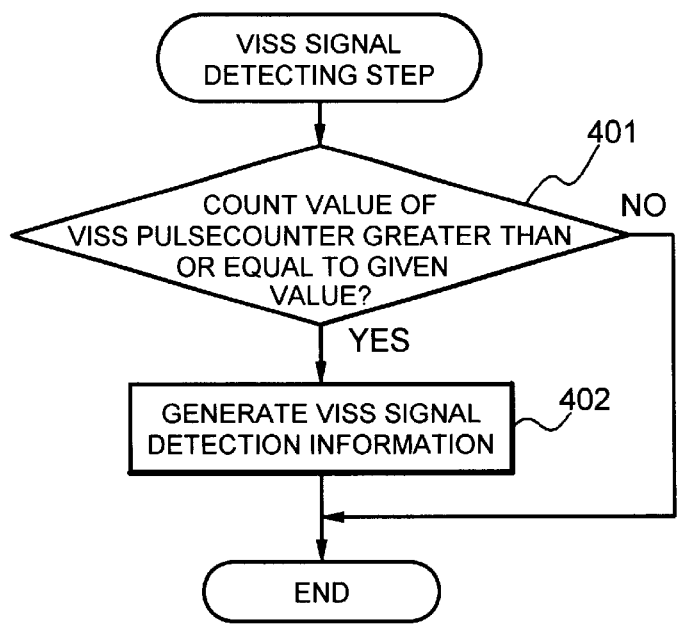
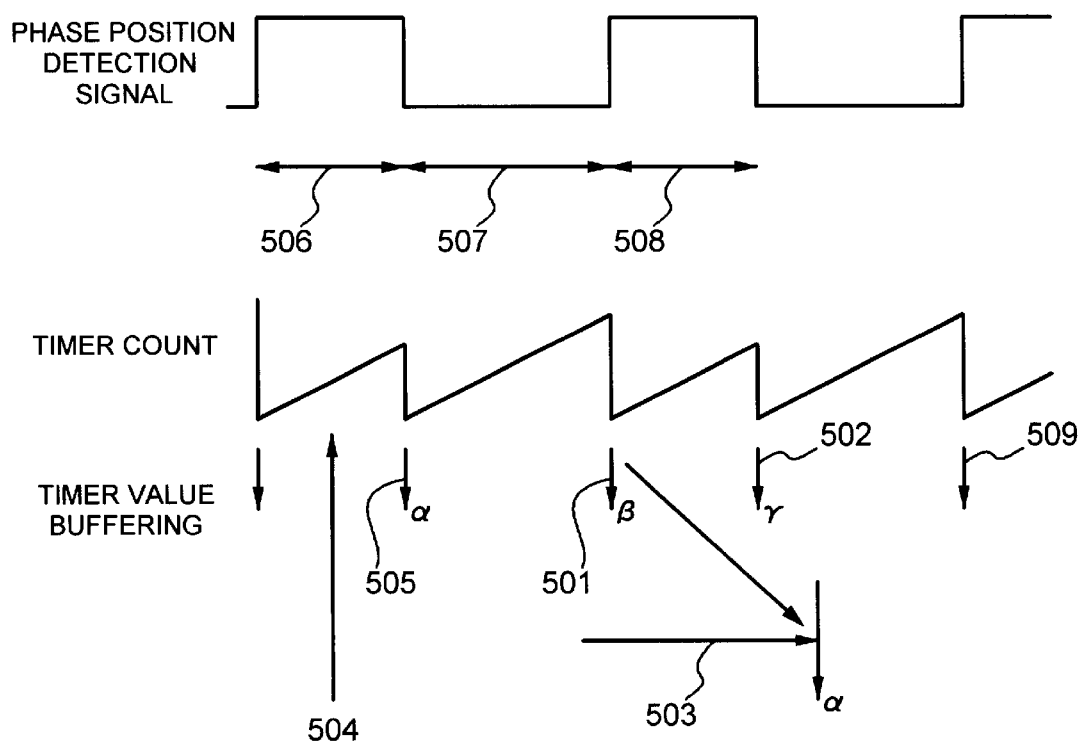

FIG. 12 (PRIOR ART)
(A) NORMAL REPRODUCTION STATE
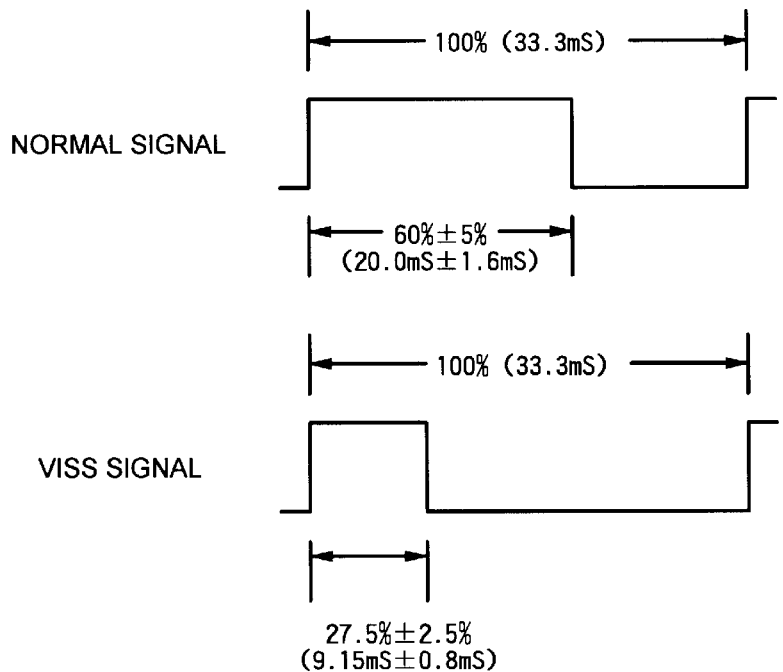
(B) MAXIMUM SPEED STATE
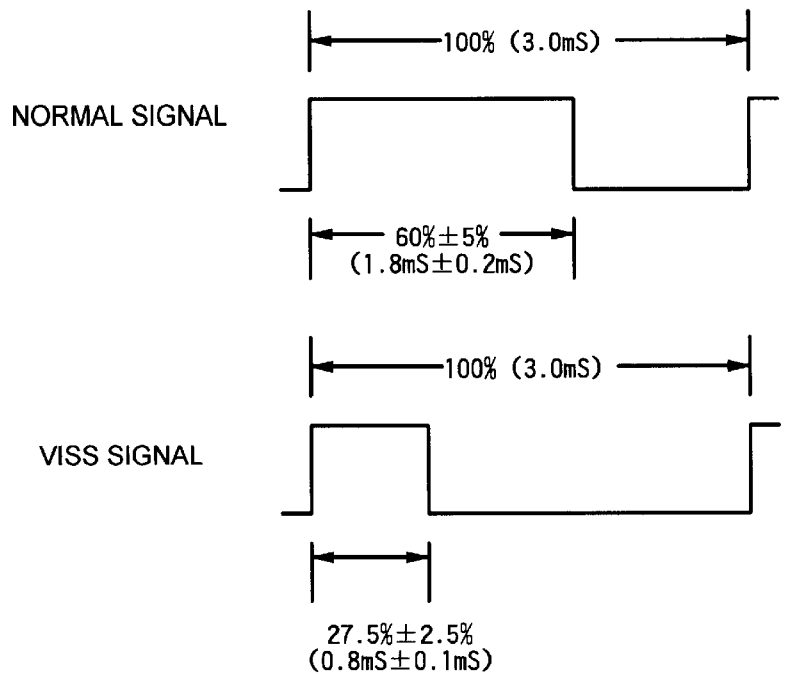

VISS SIGNAL DETECTING METHOD FOR DETECTING VISS SIGNAL OF VIDEO TAPE

BACKGROUND OF THE INVENTION

1. Field of the Invention

The present invention relates to a VISS signal detecting method enabling detection of a VISS signal of a video tape by software in a microcomputer which can not use VISS detecting function of hardware, and a storage medium storing a computer program detecting the VISS signal.

2. Description of the Related Art

A VISS signal is a signal generated by writing a given amount (number within a standard) of VISS pulses, and is used for finding a video recording start position. In general, in a versing-up operation called as an index search or so forth, a video tape traveling at high speed is scanned to perform normal reproduction from a detecting position of the VISS signal. A VISS system is a system detects a VISS pulse generated by varying a falling edge timing of a phase position detecting signal recorded upon VTR recording and make a judge that the VISS signal is found when twenty-five or more VISS pulses are sequentially detected (under standard, skipping of the pulse in the extent of one pulse in sequential detection of the VISS pulses is permitted, judgment is made that the VISS signal is detected when twenty-five pulses is detected in detection of more than or equal to 90% of write pulses).

Discussion will be given about occurrence of delay at an interruption process start timing with reference to a timing chart of FIG. 9. At a timing 901 of FIG. 9, execution of a process A is initiated. When execution demand of a process B having higher preference than the process A and a process C having lower preference than the process A occur during execution of the process A, the process A on execution is interrupted, the process B is initiated and the process C is placed in waiting for process initiation.

When the process B is completed, execution of the process A having higher preference than the process C is resumed. The process C is thus executed after completion of the process A. In this condition, assuming that execution demand for an interrupt process D having preference lower than the process A but higher than the process C occurs at a timing 903, execution of the interrupt process D is initiated immediately after completion of the process A. Thus, execution of the process C is withheld until completion of the interrupt process D. In this case, a period 910 from occurrence of the execution demand for the process C to actual initiation of execution is referred to as interruption delay period.

In a VTR system, disturbance of drive control of a motor should results in distortion of the image. Accordingly, it is ideal to set preference of an interrupt process of motor drive control as high as possible. On the other hand, in order to minimize the interruption delay period in the motor drive control process, interrupt processes having higher priority than the motor drive control process are required to shorten the process periods as short as possible.

FIG. 10 is a timing chart showing the conventional VISS signal detecting operation, and FIG. 11 is a block diagram showing an example of a register construction within a microcomputer used for conventional VISS pulse and FIG. 12 is an illustration showing a VISS pulse standard.

Operation of VISS detection using the conventional hardware will be discussed with reference to FIGS. 10 to 12. In FIG. 11, a timer 1103 measures a period of one cycle of a phase position detection signal and is cleared by interruption of the phase position detection signal. On the other hand, a count value of the timer 1103 is stored in a comparing register 1102.

At first, on the basis of a period of the phase position detection signal before a measurement timing 1005 for measuring a period of the phase position detection signal, a VISS signal judgment timing during a period of the phase position detection signal after the measurement timing is derived. Here, the VISS signal judgment timing is a timing elapsed one half (50%) of the phase position detection signal period 1001 from the measurement timing 1005. Namely, on the basis of a level of the phase position detection signal at this timing, judgement is made whether the signal is the VISS signal. Namely, at a timing where a count value derived at the immediately preceding phase position detection signal period and stored in the comparing register 1102 and the count value of the timer 1103 are match, the level of the signal waveform of the phase position detection signal is confirmed. When the phase position detection signal level is Hi level, judgment is made that the VISS signal is found. If the phase detection signal level is Low level, judgement is made that the signal is normal pulse. On the other hand, the level of the phase position detection signal at this time is detected by a level detecting portion to store in a VISS detection buffer 1108. The VISS detection buffer 1108 shores data with shifting to the VISS signal judgment buffer 1108. When the value resulting by newly taking matches with a value of a signal judgement buffer 1109, namely the value already set as a pattern upon detection of VISS (in the shown example, when Hi level is detected continuously or sequentially for a times more than or equal to twenty-five times), finding of the VISS signal is judged to generate vector interrupt.

A series of operation set forth above is performed automatically by hardware (only performing setting of pattern of the VISS signal by software), by vector interrupt occurring only upon fining of a VISS mark, the process after fining of VISS is performed by the operation of the hardware.

Setting of the hardware for detection of the VISS signal in the operation set forth above, the VISS signal is detected using rising edge of the phase position detection signal by the detecting edge selector 101 of FIG. 11. By this, when rising edge of the phase position detection signal is detected, the count value of the timer corresponding to one cycle of the phase position detection signal is stored in the register 1102. Subsequently, the timer 1103 is cleared. A period corresponding to 50% of the count value stored in the register 1102 is stored in the register 1104. In the example of FIG. 10, at a timing 1005. a length of the period 1001 is the value of the timer 1103 stored in the comparing register 1102.

Then, after clearing the timer 1103, counting in the timer is progressed again. When the count value of the timer 1103 matches with the value of the register 1104 (namely, a period of 50% of the period 1101), the phase position detection signal is detected. Then, the level of the phase position detection signal at that time in the level detecting portion 1107 is buffered in the VISS detection buffer 1108 and compared with the value of the preliminarily set VISS signal judgment buffer 1109.

Repeating the foregoing process, when a result of the level being buffered in the VISS detection buffer 1108 and the value of the VISS signal judgment buffer 1109 match, the interrupt demand 1110 notifying detection of VISS signal is output. The interrupt demand 1110 is detected by the software.

In the prior art set forth above, the VISS signal detection process and the process up to detection of the VISS signal are performed automatically by the hardware. Therefore, delay of the detection position due to other interruption may not be caused. Therefore, detection of the phase position detection signal is possible, and thus, when the phase position detection signal detected can be used in detection of the VISS signal, such detection is effective. However, detection set forth above cannot be used in certain case for the problem discussed below.

At first, it is possible that there is another timer unit using the phase position detection signal as the detection edge (for example, register 1105 of FIG. 11) and in the process by the unit, setting for detecting both edges of rising and falling in the phase position detection signal in detection of the phase position detection signal of FIG. 10. Interrupt process of the register 1105 is performed by the process controlled by the phase control signal. However, due to large process load, division of the process content by detecting both edges of the phase position detection signal is performed. Thew capture operation edge of the register 1105, clearing of the timer 1103 and the capture operation edge of the register 1102 are generated at a timing of the same signal. Therefore, it is not possibly to set the edges to be used independently of the other.

Secondly, There is a case where intervals of the phase position detection signals is not constant in the condition performing VISS detection. Upon fast feeding (FF) and rewinding (REW), detection process of the VISS signal by operation of the incorporated hardware is performed by deriving the capture position for detecting the VISS signal on the basis of a period for one cycle of the phase position detection signal immediately before. Therefore, when speed of fast feeding or rewinding is increased sequentially without increasing in stepwise at every given period, if the speed variation amount is greater than or equal to 50%, the capture position may be set with a delay to possibly cause erroneous judgment.

Next, by software, discussion will be given for the conventional method for detecting the VISS by setting, in which both of rising and falling edges of the phase position detection signal are detected, with reference to FIGS. 12 to 14.

The shown example has a setting for performing clear of the timer by both edges of the phase position detection signal of FIG. 13. Therefore, in the register storing the count value of the timer (see register 1102 of FIG. 11), a value of a zone 1301 is stored at a timing 1302, a value of a zone 1303 is stored at a timing 1304 and a value of a zone 1305 is stored at a timing 1307. On the other hand, the value of the register is held until the occurrence of the next edge. Thus, it becomes possible to make reference to the value of the register during VISS pulse judgment process (FIG. 14) triggered by the edge.

The VISS pulse judgment process of FIG. 14 will be discussed hereinafter. The VISS pulse judgment process is triggered in response to each edge of the phase: position detection signal of FIG. 13. At first, as triggered by the edge of the phase position detection signal of the timing 1302 of FIG. 13, since the value of the edge counter is "0" in the initial state, the value of the register is stored in an α buffer (steps 1401 and 1402). Then, for updating the process content, the edge counter is updated to "1" (step 1403).

The foregoing edge counter is a counter for distributing the count value of the timer measuring the interval between the edges of the phase position detection signal and counts up at rising and falling edges of the phase position detection signal to sequentially count as first value, second value . . . as "0", "1", "2", . . . After counting up to the predetermined value, counting is resumed from the initial value. On the basis of the count value of the edge counter, the buffer to store the value of the register is determined.

Next, as triggered by the edge of the phase position detection signal at the timing 1304 of FIG. 13, the value of the edge counter is "1". Therefore, the value of the register is stored in β buffer (steps 1401 and 1404. Then, by comparing the value stored in the α buffer and the value stored in the β buffer, judgment can be made whether the phase position detection signal is the VISS pulse or not (step 1405). If the phase position detection signal is VISS pulse, the value of the VISS pulse counter counting number of the VISS pulses is updated (step 1406), and otherwise, the count value of the VISS pulse counter is reset (step 1407). Then, in order to set the α buffer for storing next time, the edge counter is updated to "0" (step 1408).

Next, when judgment is made that the count value of the VISS pulse reaches the predetermined reference value, information indicative of detection of the VISS signal is generated (steps 1409 and 1410). It should be noted that it is possible to take a method to make judgement whether the VISS signal is detected or bot when the value of the VISS pulse counter reaches a given reference value by a VISS pulse count monitoring process executed at every predetermined period instead of making judgement whether the VISS signal is detected or not at every edge of the phase position detection signal.

However, since control of feeding amount of the tape has to be performed during detection of the VISS pulse, delay in initiation of VISS interrupt can be caused by interrupt control (such as tape speed control, tape phase control, rotary head speed control, rotary head phase control) having higher preference than VISS signal detection process. In the VISS signal detection process in the case where the tape is fed at a normal speed such as that upon reproduction, even if waiting of initiation of the VISS signal detection process can be caused by the interrupt process having higher preference, since sufficient period is present between respective edges (about 9.15 ms) as shown in FIG. 12A, skipping of the edge data will never be caused. However, when the tape is fed at high speed, such as those in fast feeding or rewinding, a period between the edges becomes small as shown in FIG. 12B (about 0.8 ms), if waiting of initiation of the VISS signal detection process is caused by interrupt process having higher preference, the next edge of the phase position detection signal can occur while the VISS signal detection process is in waiting state. Considering example of FIG. 13, interrupt of the VISS signal detection process occurs at a timing 1304, interrupt process 1305 having higher preference is executed. Therefore, initiation of the VISS signal detection process is delayed up to the timing 1306. As a result, the value of the register at the timing 1304 cannot be stored in the β buffer. On the other hand, since the edge occurring at a timing 1307 during process during interrupt process 1305 cannot be detected, the value of the register is overwritten upon initiation 1306 of the VISS signal detection process. Thus, the value of the register at the timing 1304 is erased.

Namely, setting of the process initiated at the timing 1306 is the process which has to be initiated at the timing 1304. Therefore, the value of the register is written in the β buffer. At this time, the value of the register has already been overwritten, the value of the register in the zone 1305 is written in the β buffer (the value of the register at the timing 130). Thus, normal judgement cannot be made.

On the other hand, in the conventional VISS signal detecting method discussed with reference to FIGS. 13 and 14, detection of the VISS signal cannot be performed upon high speed fast feeding or rewinding over five times of the tape feed speed.

As set forth above, as the prior art in detecting the VISS signal recorded in the video tape, the technology detecting the VISS signal by means of hardware, cannot be implemented by the microcomputer having not hardware construction. Even the microcomputer having hardware construction, it cannot be used for VISS signal detection.

On the other hand, the conventional method detecting the VISS signal by software encounters a problem that skipping in detection of the edge of the phase position detection signal can be caused at high speed feeding of the video tape to make it difficult to accurately detect the VISS signal.

SUMMARY OF THE INVENTION

An object of the present invention is to provide a VISS signal detection method by software which can detect an edge of phase position detection signal without skipping even at high speed feeding of a video tape, and a storage medium storing a computer program for detecting the VISS signal.

According to one aspect of the invention, a VISS signal detection method for performing detection of a VISS signal of a video tape comprises a step of executing a taking-up process of an interval between edges per level edge of the VISS signal, a step of performing a detection process of a VISS pulse, and step of performing a detection process of the VISS signal on the basis of result of detection at the VISS pulse detection step, the process of the edge interval taking-in step being set as an interrupt process having highest preference, in the VISS pulse detection step, by making reference to a count value of an edge counter for distributing count values of a timer measuring the edge interval of a phase position detection signal added to the VISS signal used in the edge interval taking-in step, presence and absence of delay in the process of the VISS pulse detected based on number of occurrence of the edge interval taking-in step occurring up to the VISS pulse detection step, and when delay is caused, post process being performed for accurately performing detection process of the VISS depending upon delay and the edge interval taking-in process in the next cycle.

By this, even the frame immediately after occurrence of delay, the VISS pulse can be detected so as to enable detection of the VISS signal even at high speed feeding of the tape, such as upon fast feeding or rewinding.

In the preferred construction, the edge interval taking-in step comprises step of checking a value of the edge counter, step of storing a value of the register storing the count value of the timer in a first buffer when the value of the edge counter when the value of the edge counter is a predetermined first value, step of storing a value of the register in a second buffer when the value of the edge counter when the value of the edge counter is a predetermined second value, step of storing a value of the register in a third buffer when the value of the edge counter when the value of the edge counter is a predetermined third value, and step of varying buffer for writing in a next value by updating the value of the edge counter in the case where the value of the edge counter is not any of the first value, second value and third value and after storing the value of the register in any one of the first buffer, second buffer and third buffer, and the step of checking the value of the VISS counter comprises operation being terminated without any process when the value of the edge counter is the second value, and in conjunction therewith, step of making judgment whether the phase position detection signal is the VISS pulse by comparing the value of the register stored in the first buffer and the value of the register stored in the second buffer, updating the count value of the VISS counter when the phase position detection signal is judged as the VISS pulse and initializing the count value of the VISS pulse counter when the phase position detection signal is not judged as the VISS pulse, when the value of the edge counter is the third value, step of making judgment whether the phase position detection signal is the VISS pulse by comparing the value of the register stored in the first buffer and the value of the register stored in the second buffer, updating the count value of the VISS counter when the phase position detection signal is judged as the VISS pulse, initializing the count value of the VISS pulse counter when the phase position detection signal is not judged as the VISS pulse and shifting the content of the third buffer to the first buffer by correcting a buffer information, when the value of the edge counter is the fourth value, step of initializing a value of the VISS pulse counter when the value of the edge counter is not any the second value, third value and the four value, and a step of initializing the edge counter after processing initialization of the counter value of the VISS counter after updating or initialization of the count value of the VISS pulse counter in the process when the value of the edge counter is the third value and when the value of the edge counter is not any of the second value, third value and fourth value.

In another preferred construction, the edge interval taking-in step further comprises step of notifying occurrence of a buffer error when the value of the edge counter becomes a predetermined fifth value by updating.

In another preferred construction, the edge interval taking-in step comprises step of checking a value of the edge counter, step of storing the value of the register storing a count value of a timer in a first buffer, when a VISS judgment reference period is set, comparing the VISS judgment reference value and a value of the first buffer to make judgement whether the phase position detection signal is the VISS pulse, when judgement is made that the phase position detection signal is the VISS pulse, updating the count value of the VISS pulse counter, and when judgement is not made that that the phase position detection signal is the VISS pulse, initializing the counter value of the VISS pulse counter, when the value of the edge counter is in a predetermined first value, when the value of the edge counter when the value of the edge counter is a predetermined second value, step of storing a value of the register in a third buffer when the value of the edge counter when the value of the edge counter is a predetermined third value, and step of varying buffer to writing in the next value by updating the edge counter when the value of the edge counter is no any of a first value, second value and third value, after updating or initialization of the count value of the VISS pulse counter in the process when the value of the edge counter is the first value, storing the value of the register to any one of the second buffer and the third buffer, updating the edge counter for varying the buffer to writer in the next value, the step of checking the value of the VISS counter comprises operation being terminated without any process when the value of the edge counter is the second value, and in conjunction therewith, step of terminating operation without performing any process when the value of the edge counter is a second value, step of setting the VISS pulse judgment reference value by measuring a period of the phase position detection signal when the value of the edge counter is third value, step of measuring a period of the phase position detection signal, setting the VISS pulse judgment reference period, shifting the content of the third buffer to the first buffer by correcting a buffer information, comparing set VISS pulse judgment reference period and the value of the first buffer, making judgment whether the phase position detection signal is the VISS pulse, updating the count value of the VISS pulse counter when the phase position detection signal is judged as VISS pulse and initializing the count value of the VISS pulse counter when the phase position detection signal is not judged as VISS pulse, when the value of the edge counter is a fourth value, step of initializing the value of the VISS pulse counter when the value of the edge counter is not any of second value, third value and fourth value, and step of initializing the edge counter after setting the VISS pulse judgement reference value and after a process of initializing the count value of the VISS counter when the value of the edge counter is not any of second value, third value and fourth value.

In another preferred construction, the edge interval taking-in step comprises step of checking a value of the edge counter, step of storing the value of the register storing a count value of a timer in a first buffer, when a VISS judgment reference period is set, comparing the VISS judgment reference value and a value of the first buffer to make judgement whether the phase position detection signal is the VISS pulse, when judgement is made that the phase position detection signal is the VISS pulse, updating the count value of the VISS pulse counter, and when judgement is not made that that the phase position detection signal is the VISS pulse, initializing the counter value of the VISS pulse counter, when the value of the edge counter is in a predetermined first value, when the value of the edge counter when the value of the edge counter is a predetermined second value, step of storing a value of the register in a third buffer when the value of the edge counter when the value of the edge counter is a predetermined third value, and step of varying buffer to writing in the next value by updating the edge counter when the value of the edge counter is no any of a first value, second value and third value, after updating or initialization of the count value of the VISS pulse counter in the process when the value of the edge counter is the first value, storing the value of the register to any one of the second buffer and the third buffer, updating the edge counter for varying the buffer to writer in the next value, the step of checking the value of the VISS counter comprises operation being terminated without any process when the value of the edge counter is the second value, and in conjunction therewith, step of terminating operation without performing any process when the value of the edge counter is a second value, step of setting the VISS pulse judgment reference value by measuring a period of the phase position detection signal when the value of the edge counter is third value, step of measuring a period of the phase position detection signal, setting the VISS pulse judgment reference period, shifting the content of the third buffer to the first buffer by correcting a buffer information, comparing set VISS pulse judgment reference period and the value of the first buffer, making judgment whether the phase position detection signal is the VISS pulse, updating the count value of the VISS pulse counter when the phase position detection signal is judged as VISS pulse and initializing the count value of the VISS pulse counter when the phase position detection signal is not judged as VISS pulse, when the value of the edge counter is a fourth value, step of initializing the value of the VISS pulse counter when the value of the edge counter is not any of second value, third value and fourth value, and step of initializing the edge counter after setting the VISS pulse judgement reference value and after a process of initializing the count value of the VISS counter when the value of the edge counter is not any of second value, third value and fourth value, in the VISS detection step, a period half of a period the measured phase position detection signal is set as the VISS pulse judgment reference period.

Also, the edge interval taking-in step comprises step of checking a value of the edge counter, step of storing the value of the register storing a count value of a timer in a first buffer, when a VISS judgment reference period is set, comparing the VISS judgment reference value and a value of the first buffer to make judgement whether the phase position detection signal is the VISS pulse, when judgement is made that the phase position detection signal is the VISS pulse, updating the count value of the VISS pulse counter, and when judgement is not made that that the phase position detection signal is the VISS pulse, initializing the counter value of the VISS pulse counter, when the value of the edge counter is in a predetermined first value, when the value of the edge counter when the value of the edge counter is a predetermined second value, step of storing a value of the register in a third buffer when the value of the edge counter when the value of the edge counter is a predetermined third value, and step of varying buffer to writing in the next value by updating the edge counter when the value of the edge counter is no any of a first value, second value and third value, after updating or initialization of the count value of the VISS pulse counter in the process when the value of the edge counter is the first value, storing the value of the register to any one of the second buffer and the third buffer, updating the edge counter for varying the buffer to writer in the next value, the step of checking the value of the VISS counter comprises operation being terminated without any process when the value of the edge counter is the second value, and in conjunction therewith, step of terminating operation without performing any process when the value of the edge counter is a second value, step of setting the VISS pulse judgment reference value by measuring a period of the phase position detection signal when the value of the edge counter is third value, step of measuring a period of the phase position detection signal, setting the VISS pulse judgment reference period, shifting the content of the third buffer to the first buffer by correcting a buffer information, comparing set VISS pulse judgment reference period and the value of the first buffer, making judgment whether the phase position detection signal is the VISS pulse, updating the count value of the VISS pulse counter when the phase position detection signal is judged as VISS pulse and initializing the count value of the VISS pulse counter when the phase position detection signal is not judged as VISS pulse, when the value of the edge counter is a fourth value, step of initializing the value of the VISS pulse counter when the value of the edge counter is not any of second value, third value and fourth value, and step of initializing the edge counter after setting the VISS pulse judgement reference value and after a process of initializing the count value of the VISS counter when the value of the edge counter is not any of second value, third value and fourth value, in the VISS detection step, a period half of a period the measured phase position detection signal is set as the VISS pulse judgment reference period.

the edge interval taking-in step further comprises a step of notifying occurrence of buffering error when the value of the edge counter becomes fifth value by updating.

According to another aspect of the invention, a computer readable memory storing a computer program performing detection of a VISS signal of a video tape by controlling a computer, the computer program comprises a step of executing a taking-up process of an interval between edges per level edge of the VISS signal, a step of performing a detection process of a VISS pulse, and step of performing a detection process of the VISS signal on the basis of result of detection at the VISS pulse detection step, the process of the edge interval talking-in step being set as an interrupt process having highest preference, in the VISS pulse detection step, by making reference to a count value of an edge counter for distributing count values of a timer measuring the edge interval of a phase position detection signal added to the VISS signal used in the edge interval taking-in step, presence and absence of delay in the process of the VISS pulse detected based on number of occurrence of the edge interval taking-in step occurring up to the VISS pulse detection step, and when delay is caused, post process being performed for accurately performing detection process of the VISS depending upon delay and the edge interval taking-in process in the next cycle.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the invention, but are for explanation and understanding only.

In the drawings:

FIG. 4 is a flowchart showing an operation of a VISS signal detecting portion of the system implementing the first embodiment of the VISS signal detecting method according to the present invention;

FIG. 5 is a timing chart showing a measurement object and operation timing in the VISS signal detection method according to the present invention;

FIG. 12 is an illustration showing a standard of the VISS pulse;

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessarily obscure the present invention.

Figure 1:
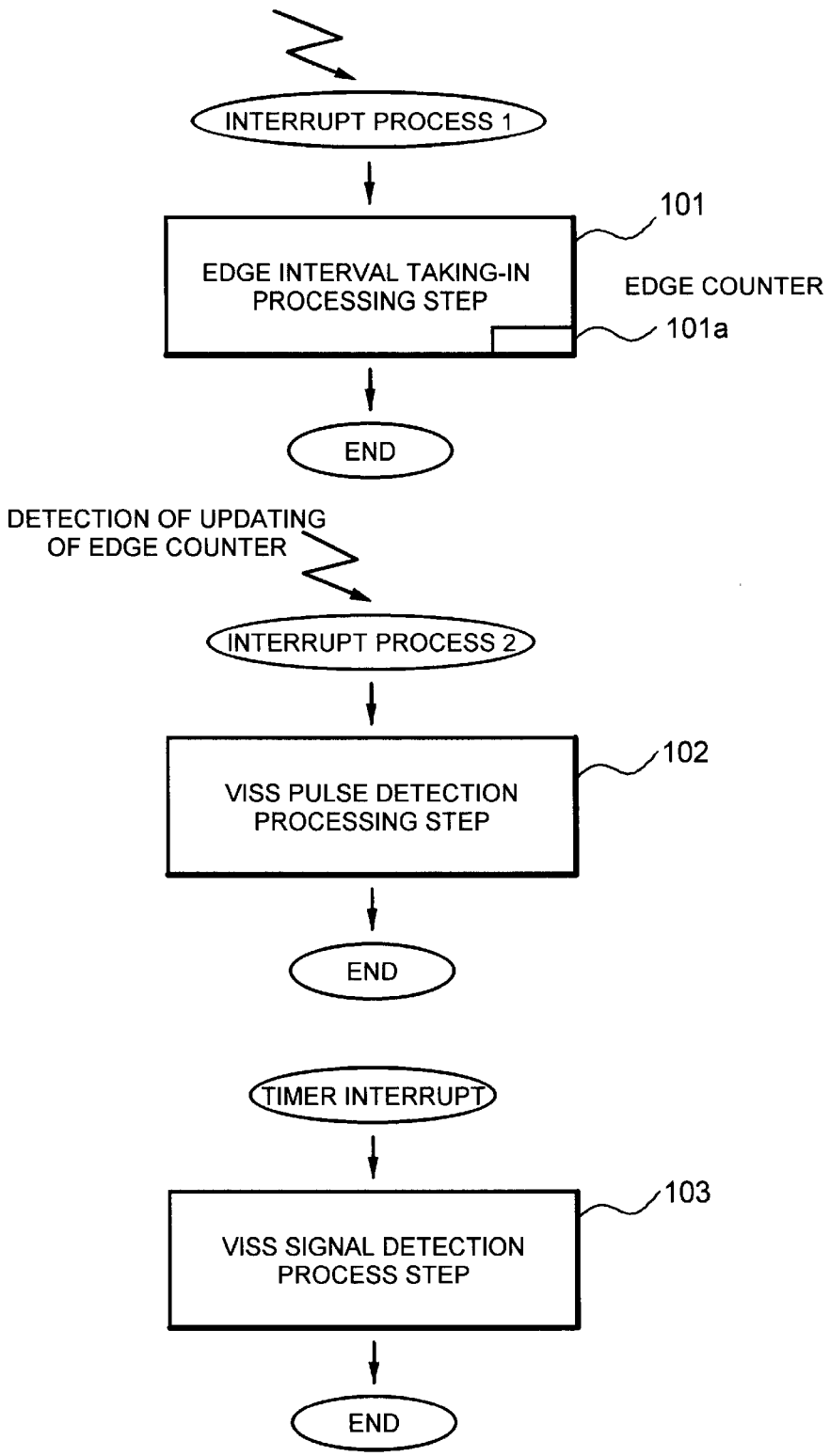
FIG. 1 is a block diagram showing a construction of a system for realizing the first embodiment a VISS signal detecting method according to the present invention.

FIG. 1 is a block diagram showing a construction of a system for realizing the first embodiment of a VISS signal detecting method according to the present invention. Referring to FIG. 1, the system realizing the shown embodiment of the method is consisted of an edge interval taking-in processing step 101 of implementing a taking-in process of an edge interval per level edge of a VISS signal, a VISS pulse detection processing step 102 of performing a detection process of a VISS pulse, which step is triggered in response to updating of an edge counter 101a used in the edge interval taking-in processing step 101, and a VISS signal detecting process step of performing detection process of a VISS signal at an interval of 100 ms. These computer programs are stored in CPU controlled by a program or in other data processing system and the internal memory.

The edge interval taking-in processing step 101 is set preference higher than other interrupt processes as much as possible so that interrupt process in response to detection of the edge can be executed even during execution of other interrupt process. By this, an interval between the edges of phase position detection signal in the register can be taken in without delay. The VISS pulse detection processing step 102 is set the preference not particularly higher than other interrupt process. Therefore, delay can be caused due to interruption by other interrupt process. However, even if the VISS pulse detection processing step 102 is delayed due to execution of other interrupt process, occurrence of delay may be detected by making the count value of the edge counter 101a which is used in the edge interval taking-in processing step 101 which is executed without delay. Thus, normal pulse judgment (comparison of α buffer and β buffer) can be performed.

Figure 11:
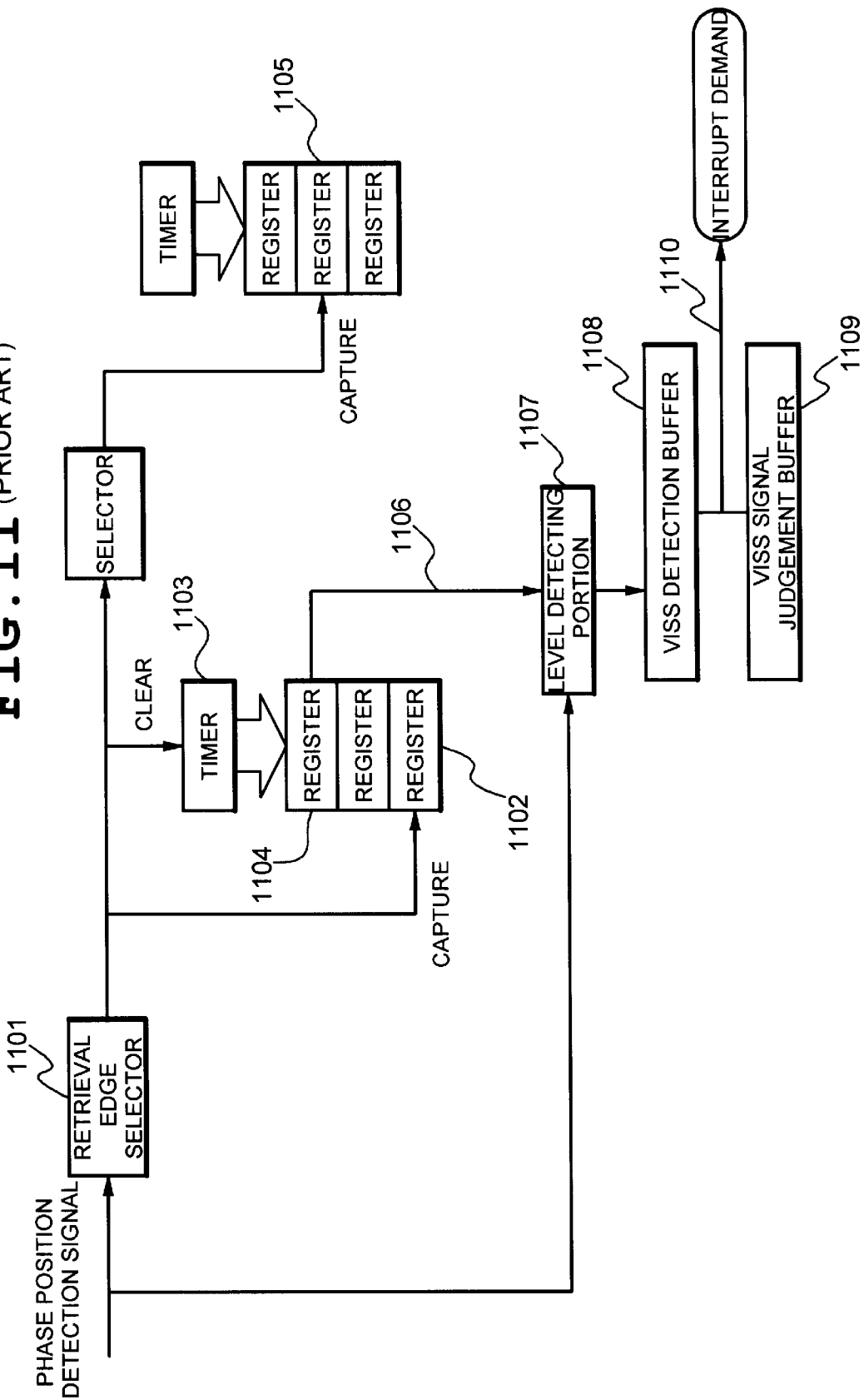
FIG. 11 is a block diagram showing an example of a hardware construction in the case where detection of the VISS signal is performed using hardware.
Figure 13:
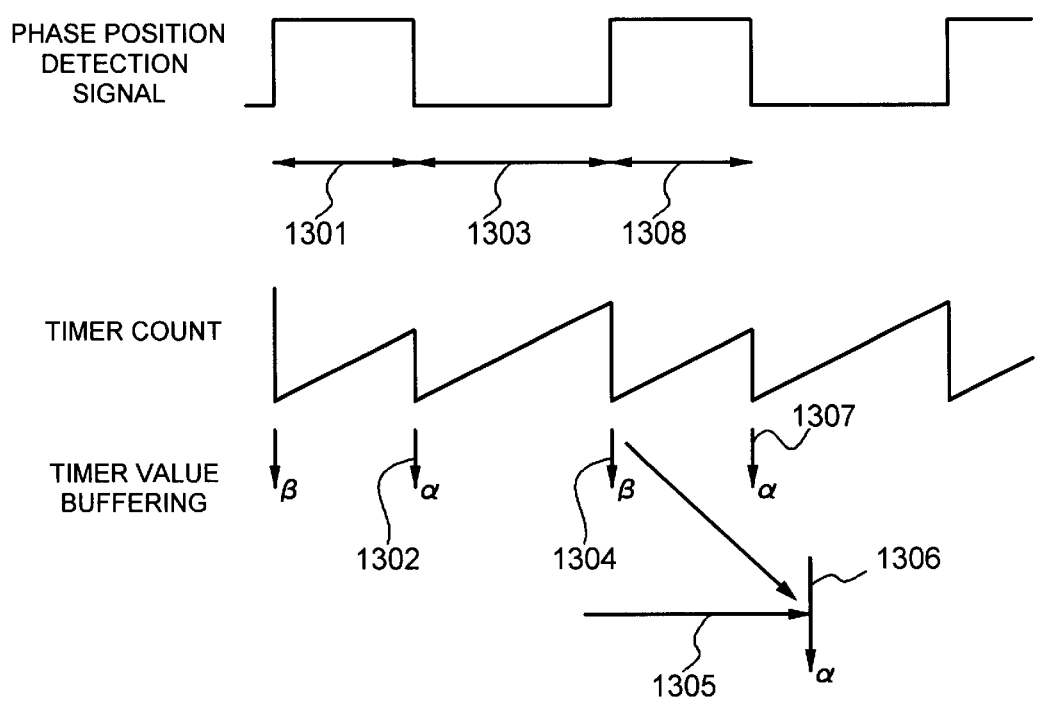
FIG. 13 is a timing chart showing measurement object and operation timing in the conventional VISS signal detecting method.
Figure 14:
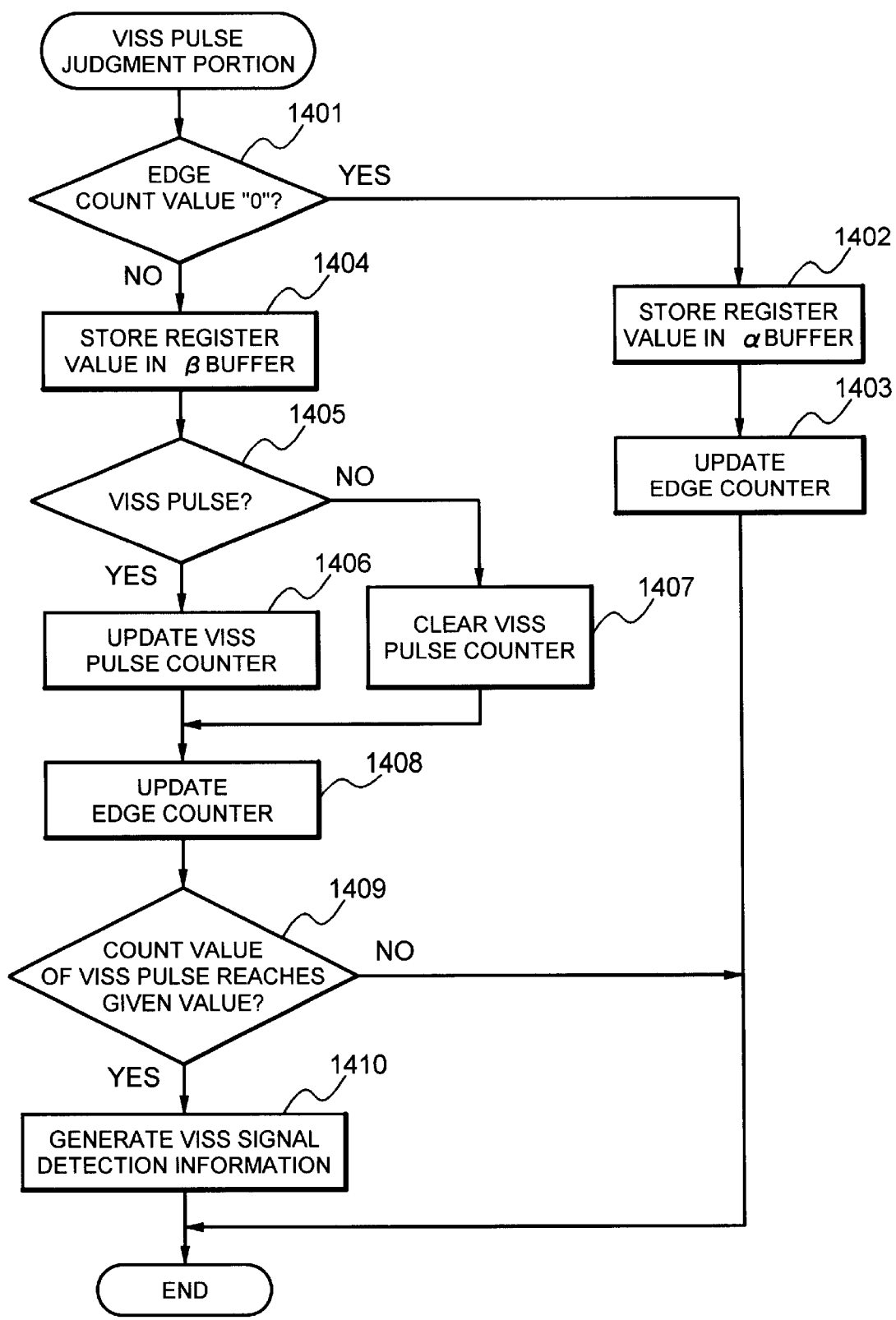
FIG. 14 is a flowchart showing the conventional VISS signal detection method by software.

The foregoing edge counter 101a is the counter which distributes the count value of the timer measuring the interval between the edges of the phase position detection signal to a plurality of buffers, and counts up (update) the rising and falling edges of the phase position detection signal as sequential, first value, second value . . . , such as "0", "1", "2", . . . . Upon counted to the predetermined value, count is restarted from the initial value. On the basis of the count value of the edge counter 101a, the buffer for storing the value of the register (see register 1102 of FIG. 11) storing the count value of the timer is determined among a plurality of buffers. It should be noted that the value counted by the edge counter 1–1a is only required to be sequential and is not essential to be the values in the shown embodiment ("0", "1", "2", . . .

Figure 2:
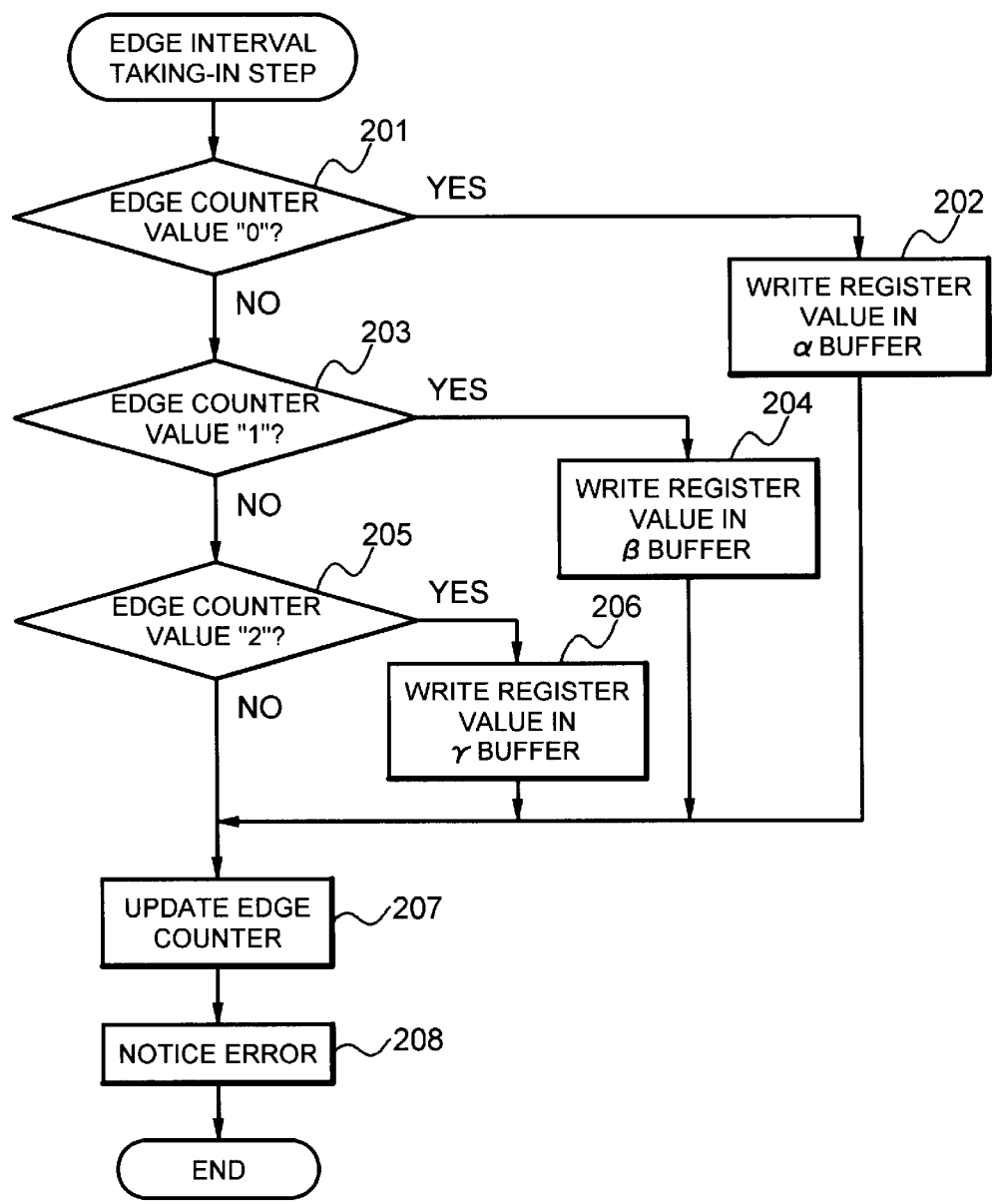
FIG. 2 is a flowchart showing an operation of an edge interval taking-in portion of the system implementing the first embodiment of the VISS signal detecting method according to the present invention.

FIG. 2 is a flowchart showing operation of the edge interval taking-in processing step 101 of the shown embodiment. The edge interval taking-in processing step 101 at first checks the value of the edge counter 101a (steps 201, 203, 205). If the value of the edge counter is "0", the value of the register (see register 1102 of FIG. 11) storing the count value of the timer is stored in the a buffer as the first buffer (steps 201, 202). On the other hand, if the value of the edge counter is "1", the value of the register storing the count value of the timer is stored in the β buffer as the second buffer (steps 203, 204). Also, if the value of the edge counter is "2", the value of the register storing the count value of the timer is stored in the γ buffer as the third buffer (steps 205, 206).

When the value of the edge counter 101a is not any of "0", "1", "2" and after storing the value of the register in any one of the α buffer, the β buffer and the γ buffer, the value of the edge counter 101a is updated to vary the buffer to write the next value (step 207). Then, when the value of the edge counter 101a becomes "4" by updating, occurrence of buffering error is noticed (step 208).

Figure 3:
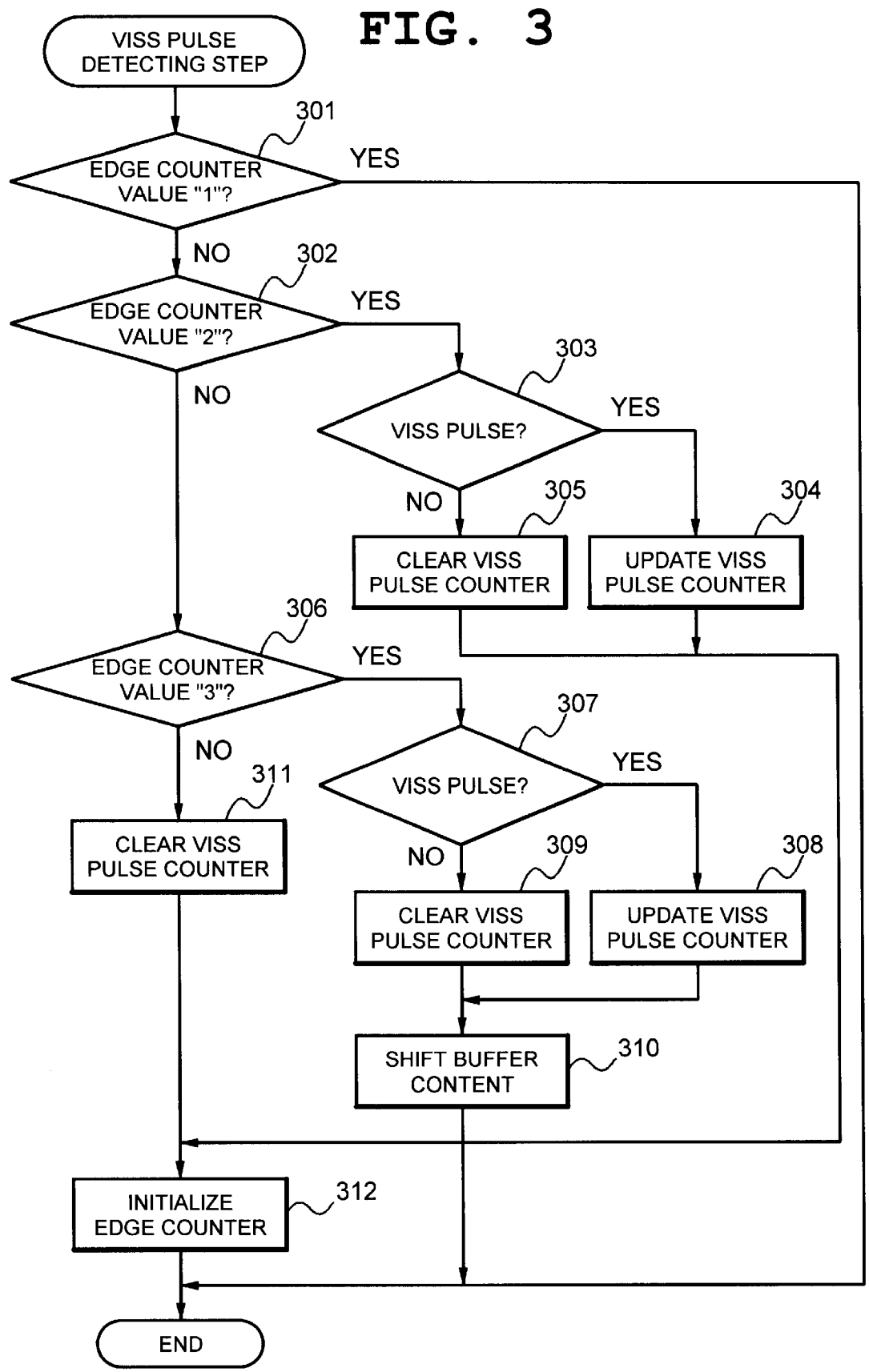
FIG. 3 is a flowchart showing an operation of a VISS pulse detecting portion of the system implementing the first embodiment of the VISS signal detecting method according to the present invention.

FIG. 3 is a flowchart showing operation of the VISS detection processing step 102 of the shown embodiment. Referring to FIG. 3, the VISS detection processing step 102 checks the value of the edge counter 101a (steps 301, 302, 306). If the value is "1", operation will goes end without performing any process (step 301). If the value of the edge counter 101 is "2", the value stored in the α buffer and the value of the β buffer are compared to make judgment whether the phase position detection signal in question is the VISS pulse or not (steps 302, 303). Then, if judgment is made that the phase position detection signal is the VISS pulse, the count value of the VISS pulse counter is updated (step 304). On the other hand, if the judgment is made that the phase position detection signal in question is not the VISS pulse, the count value of the VISS pulse counter is initialized (step 305).

After these process, the edge counter 101a is initialized (step 312). If the value of the edge counter 101a is "3", the value of the register stored in the α buffer and the value of the register stored in the β buffer are compared to make judgement whether the phase position detection signal in question is the VISS pulse (step 306, 307). Then, if judgment is made that the phase position detection signal is the VISS pulse, the count value of the VISS pulse counter is updated (step 308). On the other hand, if the judgment is made that the phase position detection signal in question is not the VISS pulse, the count value of the VISS pulse counter is initialized (step 309). After these process, if the value of the edge counter 101a is "3", the edge of the phase position detection signal occurs during delay due to interrupt process. Therefore, buffer information is corrected and the content of the buffer is shifted to the α buffer (step 310).

When the value of the edge counter 101a is not any of "0", "1", "2", judgment can be made that detection of a plurality of edges during delay due to interruption, normal pulse judgment becomes impossible. Therefore, it becomes necessary to initialize the VISS detecting process. Accordingly, the value of the VISS pulse counter is initialized (step 311). Subsequently, the edge counter 101a is initialized (step 312).

FIG. 4 is a flowchart showing operation of the VISS pulse detection process 103 of the shown embodiment. Referring to FIG. 4, the VISS pulse detection processing step 103 checks the value of the VISS pulse counter counted in the VISS pulse detection processing step 102, at first (step 401). When the value of the VISS pulse counter becomes greater than or equal to a given value, information indicative of detection of the VISS signal is generated (step 402).

Next, as an example where the interrupt demand occurs at a timing shown in a timing chart of FIG. 5, the operation of the shown embodiment will be discussed. In the shown embodiment, by detection of the edge of the phase position detection signal, even if any process is in execution, the process on process is interrupted and the edge interval taking-in processing step 101 having the highest preference is executed. Subsequently, if other interrupt process is not executed, the process by the VIDSSD pulse detection process step 102 is executed subsequently. If the process having higher preference than the process of the VISS pulse detection processing step 102 is executed or in waiting state, the process by the VISS pulse detection processing step 102 is executed after completion of all of such processes.

Particularly, when the VISS signal detection process is initiated at a timing 501 of FIG. 5, by the edge of the phase position detection signal occurring at the timing 505, the edge interval taking-in processing step 101 and the VISS pulse detection processing step 102 are triggered. On the other hand, in the edge interval taking-in processing step 101, the edge counter 101a is initialized at a timing 504 of FIG. 5.

Accordingly, the edge interval taking-in processing step 1—1 makes judgment the value of the edge counter 101a is "0" (see step 201) to write the value of the register (timing of the zone 506 of FIG. 5) is written in the α buffer (see step 202) and then the value of the edge counter 101a is updated to "1" (see step 207). On the other hand, the value of the edge counter 101a after updating does not reach "4", process is terminated without making judgment as error (see step 208).

After completion of the process in the edge interval taking-in processing step 101, the VISS pulse detection processing step is triggered. The VISS pulse detection processing step 102 terminates the process with making judgment that data to be compared is lacking since the value of the edge counter 101a is "1" (see step 301).

Next, by the edge of the phase position detection signal at the timing 501 of FIG. 5, the edge interval taking-in processing step 101 is triggered again. The edge interval taking-in processing step 101 writes in the value of the register in the β buffer since the value of the edge counter 101a is updated to "1" (see step 203, 204). Then, the value of the edge counter 101a is updated to "2" (see step 207). Since the value of the edge counter 101a is "2", the process is terminated without making judgment of error (see step 208).

When the VISS pulse detection processing step 102 is triggered after completion of the process in the edge interval taking-in processing step 101 (before the timing 502 of FIG. 5), since the value of the edge counter 101az is "2", the value of the α buffer and the value of the β buffer are compared (see steps 302 and 303). Namely, on the basis of the ratio of the period of the zone 506 and the period of the zone 507 in FIG. 5, judgment is made whether the phase position detection signal in question is the VISS pulse or not. When the phase position detection signal in question is the VISS pulse, the value of the VISS counter is updated (see step 304). If the phase position detection signal in question is not the VISS pulse, the VISS counter is initialized (see step 305). Then, for next pulse measurement, the edge counter 101a is initialized (see step 312).

On the other hand, when delay due to interruption is caused concerning the VISS pulse detection processing step 102 and the VISS pulse detection processing step 102 is triggered at a timing after the timing 502 of FIG. 5, the process of the edge interval taking-in processing step 101 at the timing 502 of FIG. 5 has already been completed, At this time, the operation of the edge interval taking-in processing step 101 checks the edge counter 101a, the value of the register (period of the zone 508 of FIG. 5) is written in the β buffer, the value of the edge counter is updated to "3" and then, the process is terminated without making judgment as error (see steps 203, 204, 207 and 208).

In this case, since the value of the edge counter 101a is "3", the VISS pulse detection processing step 102 compares the value of the α buffer and the value of the β buffer (see steps 306 and 307) to make judgment whether the phase position detection signal is the VISS pulse or not. When the phase position detection signal is judged as the VISS pulse, the value of the VISS counter is updated (see step 308). On the other hand, when the phase position detection signal is judged as not the VISS pulse, the VISS counter is initialized (see step 309). Then, the data in the γ buffer becomes the data in the α buffer. Therefore, the content of the γ buffer is shifted to the α buffer. Then, the edge counter 101a is set to "1" so that in the next edge interval taking in processing step 101, the value of the register is stored in the β buffer (see step 310).

Subsequently, at a timing at a timing 509 of FIG. 5, since the value of the edge counter 101a is "1", the value of the register is stored in the β register in the edge interval taking-in processing step 101 as set forth above. Then, when the process of the VISS pulse detection processing step 101 is performed without delay due to interruption, the VISS pulse detecting operation is performed immediately. On the other hand, at the occurrence of delay due to interruption, the value of the register is stored in the γ buffer in the edge interval taking-in processing step 101. Then, after the VISS pulse detecting operation by the VISS pulse detection processing step 102, the content of the γ buffer is shifted to the α buffer.

It should be noted that in the process by the VISS pulse detection processing step 102, if the value of the edge counter 101a is other than the effective value ("1", "2", "3"), the accumulated buffer data is made null for low reliability of the edge interval. Then, detection of the VISS signal is re-done from the initial stage, and the number of the VISS pulse detected up to that timing is cleared and the edge counter 101a is initialized to clear the edge interval data storage position.

In the shown embodiment, the VISS pulse detection processing step 102 does not perform process for making judgment whether the phase position detection signal is the VISS pulse or not by comparing the value of the α buffer and the value of the β buffer, but derives a period from the rising edge to the next falling edge at the edge of the phase position detection signal (total period of the zones 506 and 507 of FIG. 5) and thus derives a VISS judgment reference period.

Figure 6:
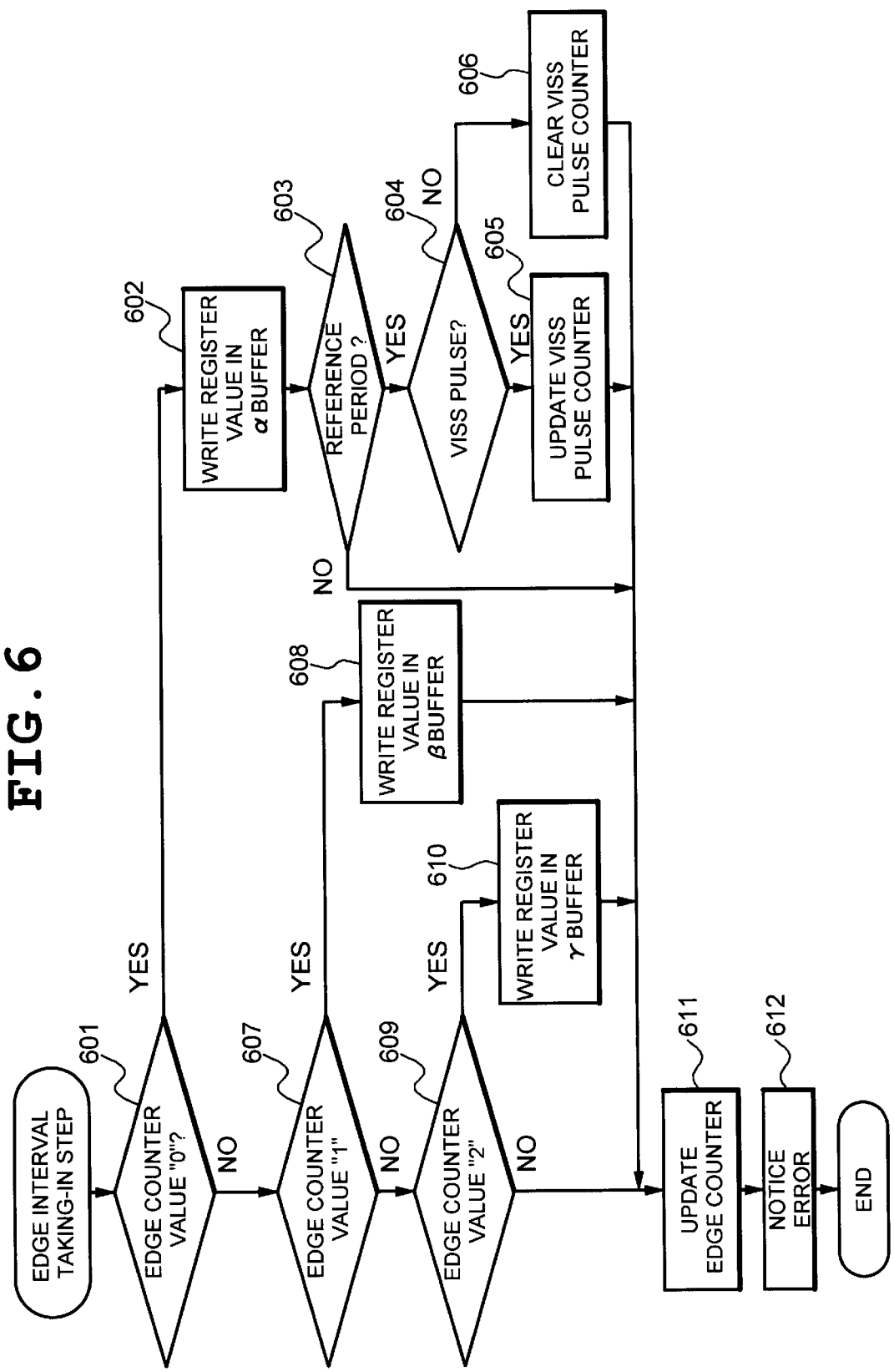
FIG. 6 is a flowchart showing operation of the edge interval taking-in portion in the second embodiment of the VISS signal detecting method according to the present invention.

As shown in FIG. 6, the edge interval taking-in processing step 1-1 takes the value of the register (period counted by the timer) in the α buffer or the γ buffer when the reference period is set by the VISS pulse detection processing step 102. Then, the taken-in period and the reference period are compared to make judgement whether the phase position detection signal is the VISS pulse or not on the basis of the result of comparison.

Figure 7:
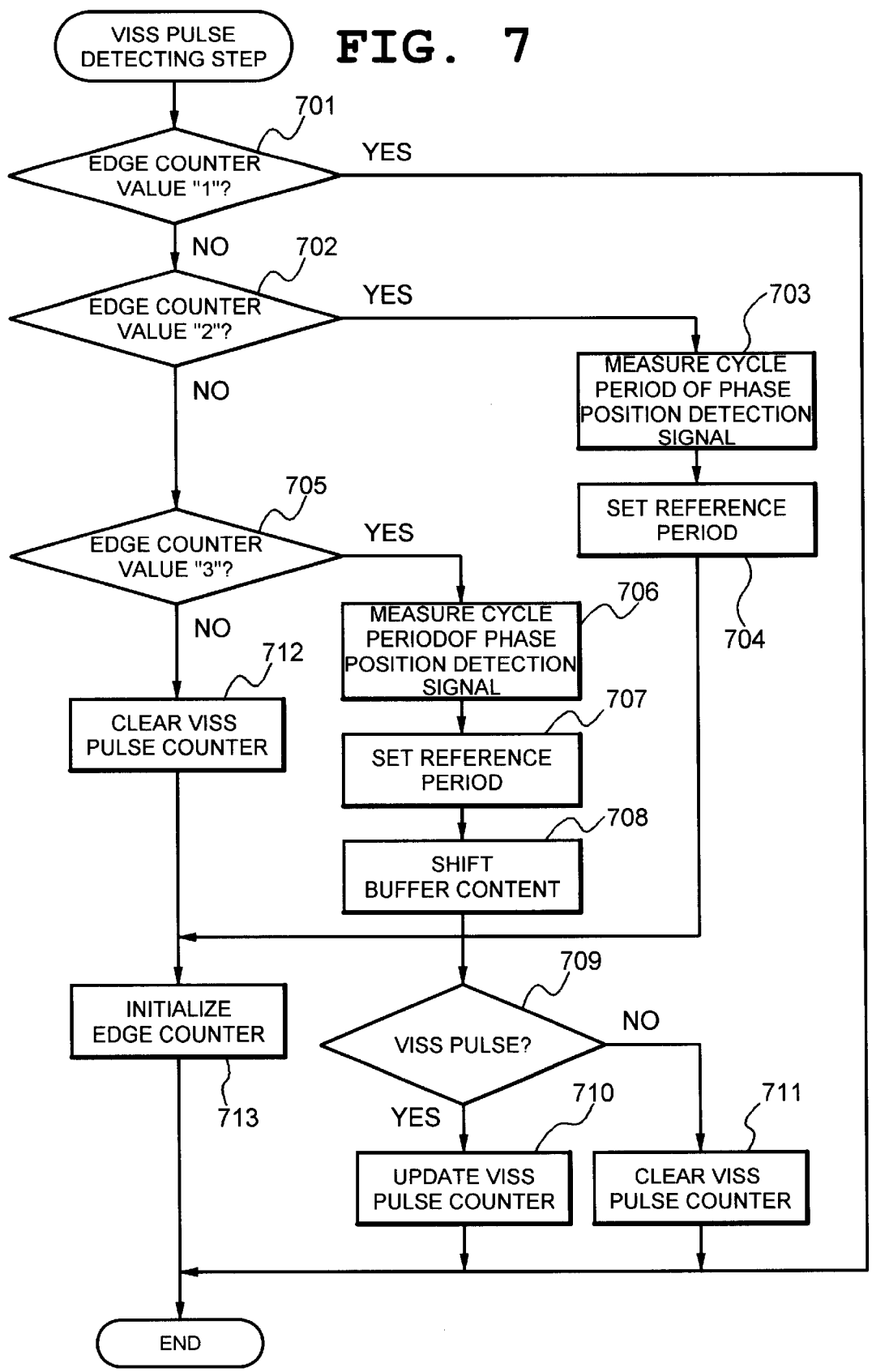
FIG. 7 is a flowchart showing an operation of a VISS pulse detecting portion of the system implementing the second embodiment of the VISS signal detecting method according to the present invention.
Figure 8:
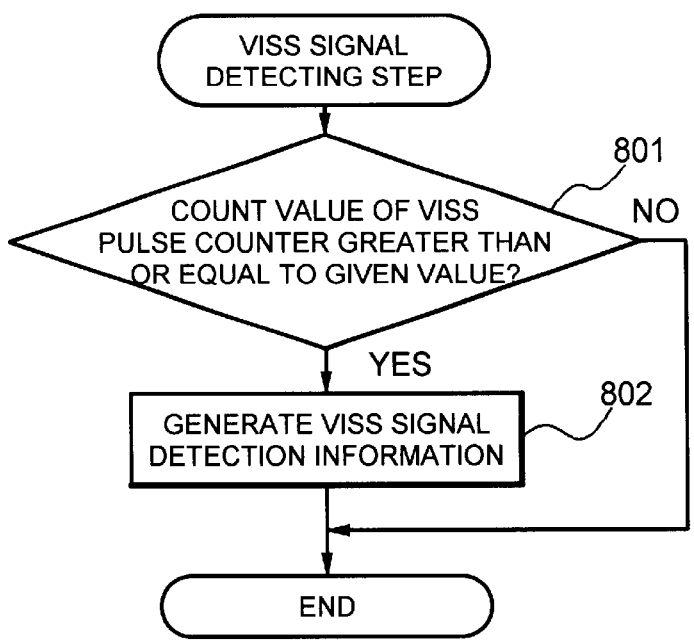
FIG. 8 is a flowchart showing an operation of a VISS signal detecting portion of the system implementing the second embodiment of the VISS signal detecting method according to the present invention.
Figure 9:
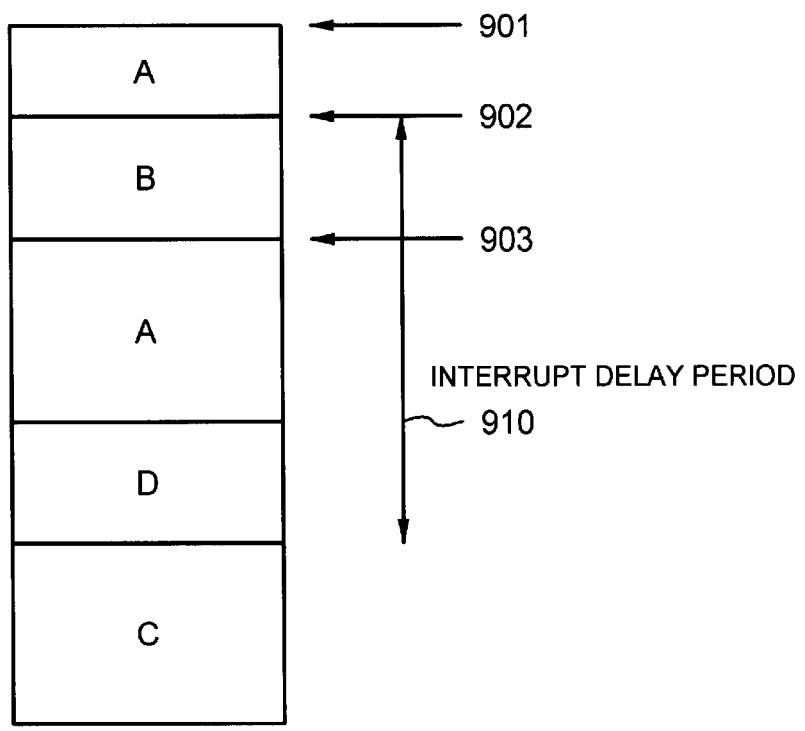
FIG. 9 is a timing chart for explaining interrupt process.
Figure 10:
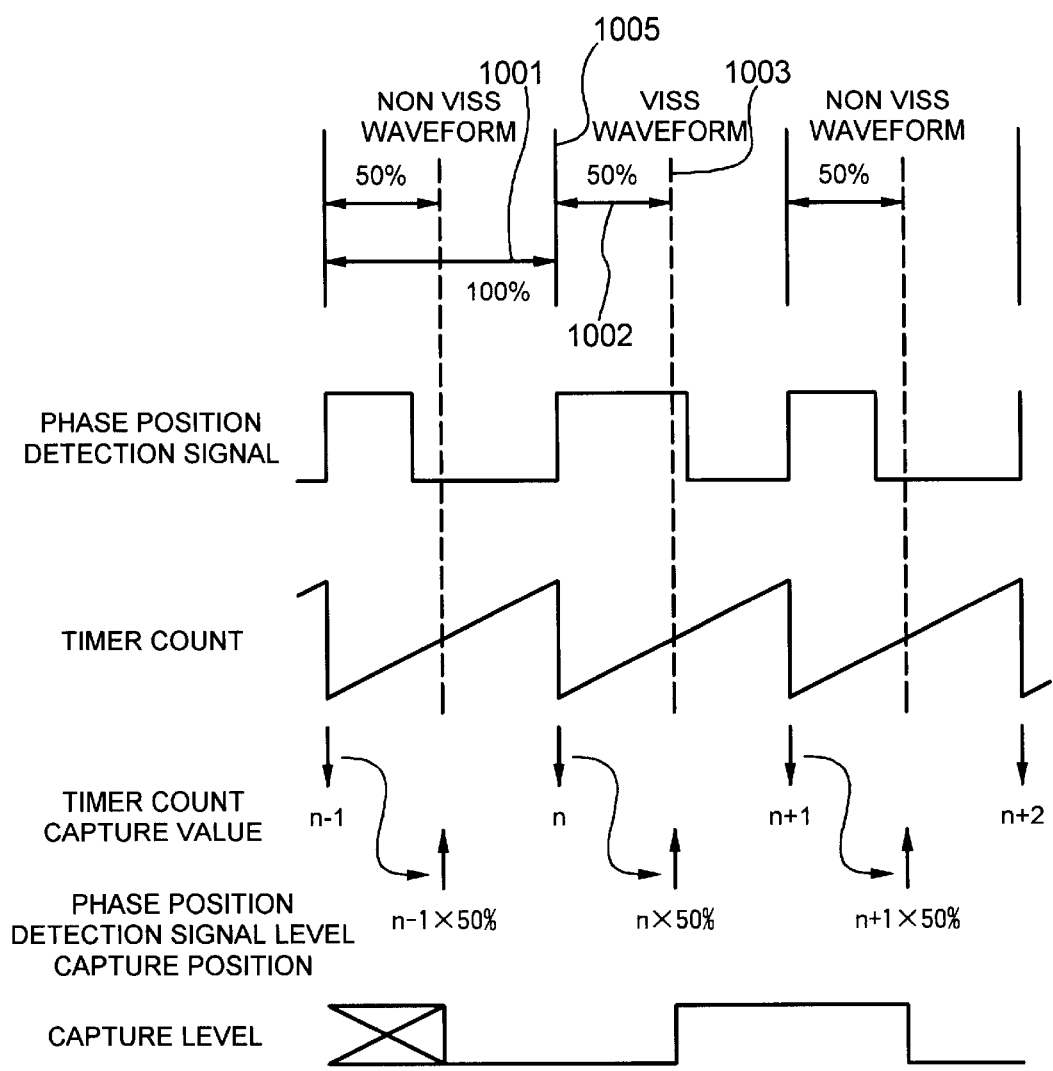
FIG. 10 is a timing chart showing detecting operation of a VISS waveform.

Next, the operation of the shown embodiment will be discussed with reference to the timing chart of FIG. 5 and flowcharts of FIGS. 6 to 8. At the timing 501 of FIG. 5, when the VISS signal detection process is initiated, at the edge of the phase position detection signal generated at the timing 505, the edge interval taking-in processing step 101 and the VISS pulse detection processing step 102 are triggered. On the other hand, in the edge interval taking-in processing step 101, the edge counter 101a is initialized at the timing 504 of FIG. 5.

Accordingly, the edge interval taking-in processing step 101 makes judgement that the value of the edge counter 101a is "0" (step 601). Then, the value of the register (the period of the zone 506) of FIG. 5) is written in the α buffer (step 602). In this process cycle, since the VISS judgment reference period (set value of the half period of the one cycle period of the phase position detection signal) is not set, updating process of the edge counter is progressed (step 603). The value of the edge counter 101a is updated (step 611). Since the value of the edge counter 101a after updating is "1", judgment is made that data for deriving the VISS judgment reference period is lacking to terminate the process (step 701).

Next, by the edge of the phase position detection signal at the timing 501 of FIG. 5, the edge interval taking-in processing step 101 is triggered again. Since the value of the edge counter 101a is updated to "1", the edge interval taking-in processing step 101 writes the value of the register in the β buffer (steps 607 and 608). Then, the value of the edge counter 101a is updated to "2" (step 611). Since the value of the edge counter 101a after updating is "2", the process is terminated without making judgment as error (step 612).

After termination of process in the edge interval taking-in processing step 101, if the VISS pulse-detection processing step 102 is triggered without causing delay due to interruption, since the value of the edge counter 101a is "2", the value stored in the α buffer and the value stored in the β buffer are added to derive the cycle period of the phase position detection signal (steps 702 and 703). Then, half of the cycle period of the derived phase position detection signal is set as the reference period for VISS pulse judgment to generate information indicative that the reference period has already been set (step 704). Thereafter, the edge counter 101a is initialized (step 713).

Subsequently, in detection of the phase position detection signal at the timing 502 of FIG. 2, since the edge counter 101a is returned to "0", the value of the register is written in the α buffer in the edge interval taking-in processing step 101 (step 601 ands 602). Then, since the VISS reference period is set at step 704, the VISS judgment reference period and the value of the α buffer are, compared to make judgment whether the phase position detection signal is the VISS pulse or not (step 604). Namely, the value of the α buffer is longer than the reference period value, judgement is made that the phase position detection signal is the VISS pulse. If judgment is made that the phase position detection signal is the VISS pulse, the value of the VISS pulse counter is updated (step 605).

If judgment is made that the phase position detection signal is not the VISS pulse, the count value of the VISS pulse counter is initialized (step 606). After these process, the edge counter 101a is updated to "1" (step 611) and then the process is terminated without making judgment as error. Then, in interrupt process triggered by the next occurring edge (timing 509 of FIG. 5) of the phase position detection signal, when the value of the edge counter 101a is "1", interrupt process is performed.

On the other hand, concerning the process of the VISS pulse detection processing step 102, delay due to interruption is caused to trigger the VISS pulse detection processing step 102 at a timing later than the timing 502 of FIG. 5, the process of the edge interval taking-in processing step 101 at the timing 502 of FIG. 5 is completed at the timing 502 of FIG. 5. At this time, the operation of the edge interval taking-in processing step 101 checks the edge counter 101a, writes the value of the register (the period of the zone 508 of FIG. 5) in the γ buffer, updates the value of the edge counter 101a to "3", and terminates the process without making judgment as error (steps 609, 610, 611 and 612).

In this case, since the value of the edge counter 101a is "3", the VISS pulse detection processing step 102 adds the value stored in the a buffer and the value stored in the β buffer to derive the cycle period of the phase position detection signal (step 706). Then, half of the cycle period of the derived phase position detection signal is set as the reference period of VISS pulse judgment. Subsequently, since the data stored in the γ buffer is next data of the α buffer, the edge counter 101a is varied to "1" so that the content of the γ buffer is shifted to the α buffer (step 708).

Next, comparing the VISS judgment reference value generated at step 707 and the value of the α buffer, judgment is made whether the phase position detection signal is the VISS pulse or not (step 709). Namely, if the value of the α buffer is loner than the reference period value, judgment is made that the phase position detection signal is the VISS pulse. When judgment is made that the phase position detection signal is the VISS pulse, the value of the VISS pulse counter is updated and then, the process is terminated (step 710). On the other hand, if judgment is made that the phase position detection signal is not the VISS pulse, the count value of the VISS pulse counter is initialized, and then the process is terminated (step 711). Then, interruption in response to the next occurring edge of the phase position detection signal (timing 509 of FIG. 5) is processed as the interrupt process when the value of the edge counter 101a is "1".

In the process in the VISS pulse detection processing step 102, if the value of the edge counter 101a is other than the effective value ("1", "2", "3"), the accumulated buffer data is made null for low reliability of the edge interval. Then, detection of the VISS signal is re-done from the initial stage, and the number of the VISS pulse detected up to that timing is cleared and the edge counter 101a is initialized to clear the edge interval data storage position.

As set forth above, respective embodiments set forth above can detect the VISS pulse even in a frame immediately after occurrence of delay by storing and processing data in the γ buffer in the edge interval taking-in process of the phase position detection signal and shifting the data in the γ buffer to the α buffer after performing detection process of the VISS pulse when execution of detection process of the VISS pulse is delayed. Therefore, in the conventional VISS signal detection method, upon occurrence of error in VISS detection process to be the cause of delay, it becomes unnecessary to perform resetting of process to enable detection of the VISS signal even upon high speed feeding of the tape upon fast feeding or rewinding.

On the other hand, in another embodiment deriving the VISS judgment reference period in the process of VISS pulse detection processing step, the buffer storing the set value of the VISS judgment reference period becomes necessary. Also, an extra process period is required for performing calculation of the period of the phase position detection signal. However, these should not affect for VISS detection performance in high speed tape feeding, such as in fast feeding or rewinding.

As set forth above, by the VISS signal detection method and the storage medium storing the computer program detecting the VISS signal in accordance with the present invention, even when period of the phase position detection signal becomes short due to high speed feeding upon fast feeding or rewinding of the tape to easily cause delay due to interruption, detection error of the edge of the phase position detection signal is not caused even upon high speed feeding of the video tape, the VISS signal can be detected accurately.

Particularly, in the conventional method, for example, when the edge of the phase position detection signal occurs even once during delay due to interruption in detection of VISS, the result of measurement of the VISS pulse up to the occurrence of the edge of the phase position detection signal has to be abandoned to restart measurement. Therefore, skipping of measurement of the VISS pulse even written up to 60 can be caused. In contrast to this, according to the present invention, upon occurrence of the edge of the phase position detection signal even once during the interrupt process of VISS pulse judgment, VISS pulse can be detected sequentially upon execution of the delayed VISS pulse judgment process.

Although the present invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

What is claimed is:

1. A VISS signal detection method for performing detection of a VISS signal of a video tape comprising:

executing a taking-in process of an interval between edges per level edge of said VISS signal;

performing a detection process of a VISS pulse; and performing a detection process of said VISS signal on the basis of result of detection in said VISS pulse detection process, wherein said taking-in process is set as an interrupt process having highest priority, and wherein said VISS pulse detection process further comprises:

detecting presence and absence of delay in the process of said VISS pulse detected based on number of occurrence of said edge interval taking-in process occurring up to said VISS pulse detection process by making reference to a count value of an edge counter for distributing count values of a timer measuring the edge interval of a phase position detection signal added to said VISS signal used in said edge interval taking-in process; and when delay is caused, performing post process for accurately performing detecting process of said VISS pulse depending upon delay and said edge interval taking-in process in the next cycle.

2. A VISS signal detection method as set forth in claim 1, wherein said edge interval taking-in process comprises:

checking a value of said edge counter;

storing a value of the register storing the count value of the timer in a first buffer when the value of said edge counter is a predetermined first value;

storing a value of the register in a second buffer when the value of said edge counter is a predetermined second value;

storing a value of the register in a third buffer when the value of said edge counter is a predetermined third value; and varying buffer for writing in a next value by updating the value of said edge counter in the case where said value of said edge counter is not any of said first value, second value and third value and after storing the value of said register in any one of said first buffer, second buffer and third buffer, wherein said checking the value of said VISS counter comprises:

terminating operation without any process when the value of said edge counter is the second value;

making judgment whether said phase position detection signal is the VISS pulse by comparing the value of the register stored in said first buffer and the value of the register stored in said second buffer, updating the count value of said VISS counter when said phase position detection signal is judged as said VISS pulse, and initializing the count value of said VISS pulse counter when said phase position detection signal is not judged as said VISS pulse, when the value of said edge counter is the third value;

making judgment whether said phase position detection signal is the VISS pulse by comparing the value of the register stored in said first buffer and the value of the register stored in said second buffer, updating the count value of said VISS counter when said phase position detection signal is judged as said VISS pulse, initializing the count value of said VISS pulse counter when said phase position detection signal is not judged as said VISS pulse and shifting the content of said third buffer to the first buffer by correcting a buffer information, when the value of said edge counter is a fourth value;

initializing a value of said VISS pulse counter when the value of said edge counter is not any of said second value, third value and fourth value; and initializing said edge counter after processing initialization of said counter value of said VISS counter after updating or after initialization of the count value of the VISS pulse counter in the process when the value of said edge counter is the third value and when the value of the edge counter is not any of said second value, third value and fourth value.

3. A VISS signal detection method as set forth in claim 2, wherein said edge interval taking-in process further comprises notifying occurrence of a buffer error when the value of said edge counter becomes a predetermined fifth value by updating.

4. A VISS signal detection method as set forth in claim 1, wherein said edge interval taking-in process comprises:

checking a value of said edge counter;

when the value of said edge counter is a predetermined first value, storing the value of the register storing a count value of a timer in a first buffer, comparing said VISS judgment reference value and a value of said first buffer to make judgement whether said phase position detection signal is the VISS pulse when a VISS judgment reference period is set, updating the count value of said VISS pulse counter when judgement is made that said phase position detection signal is the VISS pulse, and initializing the counter value of said VISS pulse counter when judgement is not made that that said phase position detection signal is the VISS pulse;

storing a value of the register in a second buffer when the value of said edge counter is a predetermined second value;

storing a value of the register in a third buffer when the value of said edge counter is a predetermined third value; and varying buffer for writing in the next value by updating said edge counter when the value of said edge counter is not any of a first value, second value and third value, after updating or initialization of the count value of said VISS pulse counter in the process when the value of said edge counter is the first value, and after storing the value of said register to any one of said second buffer and said third buffer, and wherein said checking the value of said VISS pulse counter comprises:

terminating operation without performing any process when the value of said edge counter is a second value;

setting said VISS pulse judgment reference period by measuring a period of the phase position detection signal when the value of said edge counter is third value;

measuring a period of the phase position detection signal, setting said VISS pulse judgment reference period, shifting the content of the third buffer to the first buffer by correcting a buffer information, comparing set VISS pulse judgment reference period and the value of the first buffer, making judgment whether said phase position detection signal is the VISS pulse, updating the count value of the VISS pulse counter when the phase position detection signal is judged as VISS pulse and initializing the count value of said VISS pulse counter when the phase position detection signal is not judged as VISS pulse, when the value of said edge counter is a fourth value;

initializing the value of said VISS pulse counter when the value of the edge counter is not any of second value, third value and fourth value; and initializing said edge counter after setting said VISS pulse judgement reference period and after a process of initializing the count value of said VISS pulse counter when the value of said edge counter is not any of second value, third value and fourth value.

5. A VISS signal detection method as set forth in claim 1, wherein said edge interval taking-in process comprises:

checking a value of said edge counter;

when the value of said edge counter is a predetermined first value, storing the value of the register storing a count value of a timer in a first buffer, comparing said VISS judgment reference value and a value of said first buffer to make judgement whether said phase position detection signal is the VISS pulse when a VISS judgment reference period is set, updating the count value of said VISS pulse counter when judgement is made that said phase position detection signal is the VISS pulse, and initializing the counter value of said VISS pulse counter when judgement is not made that that said phase position detection signal is the VISS pulse;

storing a value of the register in a second buffer when the value of said edge counter is a predetermined second value;

storing a value of the register in a third buffer when the value of said edge counter is a predetermined third value; and varying buffer for writing in the next value by updating said edge counter when the value of said edge counter is not any of a first value, second value and third value, after updating or initialization of the count value of said VISS pulse counter in the process when the value of said edge counter is the first value, and after storing the value of said register to any one of said second buffer and said third buffer, and wherein said checking the value of said VISS pulse counter comprises:

terminating operation without performing any process when the value of said edge counter is a second value;

setting said VISS pulse judgment reference period by measuring a period of the phase position detection signal when the value of said edge counter is third value;

measuring a period of the phase position detection signal, setting said VISS pulse judgment reference period, shifting the content of the third buffer to the first buffer by correcting a buffer information, comparing set VISS pulse judgment reference period and the value of the first buffer, making judgment whether said phase position detection signal is the VISS pulse, updating the count value of the VISS pulse counter when the phase position detection signal is judged as VISS pulse and initializing the count value of said VISS pulse counter when the phase position detection signal is not judged as VISS pulse, when the value of said edge counter is a fourth value;

initializing the value of said VISS pulse counter when the value of the edge counter is not any of second value, third value and fourth value; and initializing said edge counter after setting said VISS pulse judgement reference period and after a process of initializing the count value of said VISS pulse counter when the value of said edge counter is not any of second value, third value and fourth value, wherein in said VISS detection process, a period half of a period of the measured phase position detection signal is set as said VISS pulse judgment reference period.

6. A VISS signal detection method as set forth in claim 1, wherein said edge interval taking-in process comprises:

checking a value of said edge counter;

when the value of said edge counter is a predetermined first value, storing the value of the register storing a count value of a timer in a first buffer, comparing said VISS judgment reference value and a value of said first buffer to make judgement whether said phase position detection signal is the VISS pulse when a VISS judgment reference period is set, updating the count value of said VISS pulse counter when judgement is made that said phase position detection signal is the VISS pulse, and initializing the counter value of said VISS pulse counter when judgement is not made that that said phase position detection signal is the VISS pulse;

storing a value of the register in a second buffer when the value of said edge counter is a predetermined second value;

storing a value of the register in a third buffer when the value of said edge counter is a predetermined third value; and varying buffer for writing in the next value by updating said edge counter when the value of said edge counter is not any of a first value, second value and third value, after updating or initialization of the count value of said VISS pulse counter in the process when the value of said edge counter is the first value, and after storing the value of said register to any one of said second buffer and said third buffer, and wherein said checking the value of said VISS pulse counter comprises:
  terminating operation without performing any process when the value of said edge counter is a second value;
  setting said VISS pulse judgment reference period by measuring a period of the phase position detection signal when the value of said edge counter is third value;
  measuring a period of the phase position detection signal, setting said VISS pulse judgment reference period, shifting the content of the third buffer to the first buffer by correcting a buffer information, comparing set VISS pulse judgment reference period and the value of the first buffer, making judgment whether said phase position detection signal is the VISS pulse, updating the count value of the VISS pulse counter when the phase position detection signal is judged as VISS pulse and initializing the count value of said VISS pulse counter when the phase position detection signal is not judged as VISS pulse, when the value of said edge counter is a fourth value;
  initializing the value of said VISS pulse counter when the value of the edge counter is not any of second value, third value and fourth value; and
  initializing said edge counter after setting said VISS pulse judgement reference period and after a process of initializing the count value of said VISS pulse counter when the value of said edge counter is not any of second value, third value and fourth value,
  wherein in said VISS detection process, a period half of a period of the measured phase position detection signal is set as said VISS pulse judgment reference period, and
  wherein said edge interval taking-in process further comprises notifying occurrence of buffering error when the value of said edge counter becomes a fifth value by updating.

7. A computer readable memory storing a computer program performing detection of a VISS signal of a video tape by controlling a computer, said computer program comprising:
  executing a taking-in process of an interval between edges per level edge of said VISS signal;
  performing a detection process of a VISS pulse; and
  performing a detection process of said VISS signal on the basis of result of detection in said VISS pulse detection process,
  wherein said edge interval talking-in process is set as an interrupt process having highest priority, and
  wherein said VISS pulse detection process further comprises:
    detecting presence and absence of delay in the process of said VISS pulse detected based on number of occurrence of said edge interval taking-in process occurring up to said VISS pulse detection process by making reference to a count value of an edge for distributing count values of a timer measuring the edge interval of a phase position detection signal added to said VISS signal used in said edge interval taking-in process; and
    when delay is caused, performing post process for accurately performing detecting process of said VISS pulse depending upon delay and said edge interval taking-in process in the next cycle.

8. A computer readable memory as set forth in claim 7, wherein said edge interval taking-in process of said computer program comprises:
  checking a value of said edge counter;
  storing a value of the register storing the count value of the timer in a first buffer when the value of said edge counter is a predetermined first value;
  storing a value of the register in a second buffer when the value of said edge counter is a predetermined second value;
  storing a value of the register in a third buffer when the value of said edge counter is a predetermined third value; and
  varying buffer for writing in a next value by updating the value of said edge counter in the case where said value of said edge counter is not any of said first value, second value and third value and after storing the value of said register in any one of said first buffer, second buffer and third buffer,
  wherein said checking the value of said VISS counter comprises: terminating operation without any process when the value of said edge counter is the second value;
  making judgment whether said phase position detection signal is the VISS pulse by comparing the value of the register stored in said first buffer and the value of the register stored in said second buffer, updating the count value of said VISS counter when said phase position detection signal is judged as said VISS pulse and initializing the count value of said VISS pulse counter when said phase position detection signal is not judged as said VISS pulse, when the value of said edge counter is the third value;
  making judgment whether said phase position detection signal is the VISS pulse by comparing the value of the register stored in said first buffer and the value of the register stored in said second buffer, updating the count value of said VISS counter when said phase position detection signal is judged as said VISS pulse, initializing the count value of said VISS pulse counter when said phase position detection signal is not judged as said VISS pulse and shifting the content of said third buffer to the first buffer by correcting a buffer information, when the value of said edge counter is a fourth value;
  initializing a value of said VISS pulse counter when the value of said edge counter is not any of second value, third value and fourth value; and
  initializing said edge counter after processing initialization of said counter value of said VISS counter after updating or after initialization of the count value of the VISS pulse counter in the process when the value of said edge counter is the third value and when the value of the edge counter is not any of said second value, third value and fourth value.

9. A computer readable memory as set forth in claim 8, wherein said edge interval taking-in process of said computer program further comprises notifying occurrence of a buffer error when the value of said edge counter becomes a predetermined fifth value by updating.

10. A computer readable memory as set forth in claim 7, wherein said edge interval taking-in process of said computer program comprises:
  checking a value of said edge counter;
  when the value of said edge counter is in a predetermined first value, storing the value of the register storing a count value of a timer in a first buffer, comparing said VISS judgment reference value and a value of said first buffer to make judgement whether said phase position detection signal is the VISS pulse when a VISS judgment reference period is set, updating the count value of said VISS pulse counter when judgement is made that said phase position detection signal is the VISS pulse, and initializing the counter value of said VISS pulse counter when judgement is not made that that said phase position detection signal is the VISS pulse;

storing a value of the register in a second buffer when the value of said edge counter is a predetermined second value;

storing a value of the register in a third buffer when the value of said edge counter is a predetermined third value; and varying buffer for writing in the next value by updating said edge counter when the value of said edge counter is not any of a first value, second value and third value, after updating or initialization of the count value of said VISS pulse counter in the process when the value of said edge counter is the first value, and after storing the value of said register to any one of said second buffer and said third buffer, and wherein said checking the value of said VISS pulse counter comprises:
  terminating operation without performing any process when the value of said edge counter is a second value;
  setting said VISS pulse judgment reference period by measuring a period of the phase position detection signal when the value of said edge counter is third value;
  measuring a period of the phase position detection signal, setting said VISS pulse judgment reference period, shifting the content of the third buffer to the first buffer by correcting a buffer information, comparing set VISS pulse judgment reference period and the value of the first buffer, making judgment whether said phase position detection signal is the VISS pulse, updating the count value of the VISS pulse counter when the phase position detection signal is judged as VISS pulse and initializing the count value of said VISS pulse counter when the phase position detection signal is not judged as VISS pulse, when the value of said edge counter is a fourth value;
  initializing the value of said VISS pulse counter when the value of the edge counter is not any of second value, third value and fourth value; and
  initializing said edge counter after setting said VISS pulse judgement reference period and after a process of initializing the count value of said VISS pulse counter when the value of said edge counter is not any of second value, third value and fourth value.

11. A computer readable memory as set forth in claim 7, wherein said edge interval taking-in process of said computer program comprises:
  checking a value of said edge counter;
  when the value of said edge counter is in a predetermined first value, storing the value of the register storing a count value of a timer in a first buffer, comparing said VISS judgment reference value and a value of said first buffer to make judgement whether said phase position detection signal is the VISS pulse when a VISS judgment reference period is set, updating the count value of said VISS pulse counter when judgement is made that said phase position detection signal is the VISS pulse, and initializing the counter value of said VISS pulse counter when judgement is not made that that said phase position detection signal is the VISS pulse;

storing a value of the register in a second buffer when the value of said edge counter is a predetermined second value;

storing a value of the register in a third buffer when the value of said edge counter is a predetermined third value; and varying buffer for writing in the next value by updating said edge counter when the value of said edge counter is not any of a first value, second value and third value, after updating or initialization of the count value of said VISS pulse counter in the process when the value of said edge counter is the first value, and after storing the value of said register to any one of said second buffer and said third buffer, and wherein said checking the value of said VISS pulse counter comprises:
  terminating operation without performing any process when the value of said edge counter is a second value;
  setting said VISS pulse judgment reference period by measuring a period of the phase position detection signal when the value of said edge counter is third value;
  measuring a period of the phase position detection signal, setting said VISS pulse judgment reference period, shifting the content of the third buffer to the first buffer by correcting a buffer information, comparing set VISS pulse judgment reference period and the value of the first buffer, making judgment whether said phase position detection signal is the VISS pulse, updating the count value of the VISS pulse counter when the phase position detection signal is judged as VISS pulse and initializing the count value of said VISS pulse counter when the phase position detection signal is not judged as VISS pulse, when the value of said edge counter is a fourth value;
  initializing the value of said VISS pulse counter when the value of the edge counter is not any of second value, third value and fourth value; and
  initializing said edge counter after setting said VISS pulse judgement reference period and after a process of initializing the count value of said VISS pulse counter when the value of said edge counter is not any of second value, third value and fourth value,
  wherein in said VISS detection process, a period half of a period of the measured phase position detection signal is set as said VISS pulse judgment reference period.

12. A computer readable memory as set forth in claim 7, wherein said edge interval taking-in process of said computer program further comprises notifying occurrence of buffering error when the value of said edge counter becomes a fifth value by updating.

* * * * *